United States Patent [19]
Kay

[11] 4,183,373
[45] Jan. 15, 1980

[54] FLUID PRESSURE-OPERATED SYSTEMS

[76] Inventor: Francis X. Kay, The School House, Addington, Buckinghamshire, England

[21] Appl. No.: 899,154

[22] Filed: Apr. 24, 1978

[51] Int. Cl.² ............................................. F16K 11/00
[52] U.S. Cl. .................................. 137/269.5; 137/270; 137/271; 137/884
[58] Field of Search ..................... 137/269, 269.5, 270, 137/271, 884

[56] References Cited
U.S. PATENT DOCUMENTS

| | | | |
|---|---|---|---|
| 3,765,274 | 9/1973 | Wolfgramm | 137/271 X |
| 3,881,513 | 5/1975 | Chang | 137/271 |
| 4,095,863 | 6/1978 | Harden | 137/884 X |

Primary Examiner—Alan Cohan
Attorney, Agent, or Firm—Kurt Kelman

[57] ABSTRACT

An interconnecting unit for reliably establishing compact and readily rearrangeable connections between the components of a fluid pressure-operated system comprises a matrix block with primary and secondary sets of non-intersecting passages adapted for connection to system components has linking passages joining each primary passage with every secondary passage, communication and flow-control between the so-joined passages being determined by the introduction of flow-controlling plug members selectively into the associated linking passages.

13 Claims, 7 Drawing Figures

FLUID PRESSURE-OPERATED SYSTEMS

FIELD OF THE INVENTION

THIS INVENTION concerns fluid pressure-operated systems and is especially concerned with the setting up and adaption of such systems to achieve desired functions and/or operational sequences in such systems. Although the invention is especially applicable to pneumatic systems—or in general systems employing a compressed compressible working fluid, the invention, as will appear, is also applicable to systems, such as hydraulic systems, utilising an incompressible working fluid.

BACKGROUND TO THE INVENTION

An inhibiting factor in the use of fluid pressure-operated systems for automation and control purposes is the need for expertise in the design of the relevant circuits that must link perhaps a large number of operating components in an appropriate relationship to achieve the operation of the respective components in a specific order and/or timed relationship. In a system of any complexity a large number of interconnections are required and if these are to be effected by means of conventional piping and connectors the layout of such elements requires considerable skill, while the ultimate assembly of such elements equally involves skill and the utilisation of considerable space. The space requirements may impose major constraints upon the operational possibilities achievable witin a given envelope. Moreover, assembly faults may easily occur, and the tracing of such faults, and of component faults arising in operation, can be extremely difficult and time consuming.

In addition, a complex system having its components interconnected by conventional elements to achieve a given operational function and/or sequence cannot often be readily rearranged ("programmed") to achieve another operational function and/or sequence without major disassembly and redesign of the component interconnections.

For all these reasons the development and utilisation of fluid pressure-operated systems for control and like purposes has suffered undesirable constraints. An object of the present invention is to provide an interconnection unit to which a plurality of operational components of a fluid pressure-operated system may be connected and that allows the ready established of desired interconnections between such components and, likewise the simple rearrangement of such interconnections when required.

THE INVENTION

In accordance with the invention, an interconnecting unit comprises a matrix block having primary and secondary sets of non-intersecting passages disposed in superposed relationship with each passage of each set extending transversely across all the passages of the other set; individual linking passages joining each passage of the primary set with every passage of the secondary set; and flow-controlling plug members adapted to be fitted to said linking passages selectively to control fluid flow between primary and secondary passages joined by the linking passage fitted with such a plug member.

The unit may include plug members of different functional types respectively adapted, when inserted into one of said linking passages, to control fluid flow between the linked primary and secondary set passages in a particular manner: for instance to prevent such flow; to restrict such flow in either or both directions; or to permit such flow of fluid only in one direction and/or only in response to a preselected pressure differential. In preferred embodiments of the invention each plug member incorporates two or more fluid flow-controlling elements that may selectively be brought into operational relationship with the linked passages of the primary and secondary sets in accordance with the position and/or orientation of the plug member into the relevant linking passage.

Thus in a preferred embodiment of the invention the interconnecting unit includes plug members having both flow-blocking and one-way flow elements selectively positionable in operative relation to the linked passages of the primary and secondary sets by insertion in the relevant linking passage to different depths as measured from a reference or, as is preferred, by insertion in the relevant linking passage in one or the other of two different permissible orientations.

Such a preferred form of interconnecting unit may also include special-purpose plug members that when fitted to a selected linking passage will provide a desired flow-controlling function in respect of the related linked passages of the primary and secondary sets. For instance, such a special-purpose plug member may incorporate a throttle element, an element that permits unrestricted fluid flow in one direction but restricts (throttles) fluid flow in the opposite direction between the said linked passages, or an element that permits fluid flow only under a preselected pressure differential or within a preselected pressure range.

In preferred forms of the interconnecting unit, the matrix block is of generally rectangular parallelepipedon shape, the passages of the primary set being arranged parallel with one another and with major faces of the block and extending from one edge face thereof, the passages of the secondary set similarly being parallel with one another and with the major faces of the matrix block but extending from another edge face of the latter so that their axes are at rightangles to those of the primary set passages, these two sets of passages being arranged at different depths, as measured from one major face of the block, so as to be non-intersecting, while the linking passages extend through the block from one major face to the other thereof, each intersecting an individual pair of primary and secondary set passages.

The respective passages may conveniently be circular in section to facilitate their formation in a matrix block by a conventional machining operation, although other cross-sectional configurations may be adopted if required.

Preferably the plug members utilised with such a matrix block are in the form of shafts having a length greater than the total length of the linking passages in which they are to be received, an operative portion of the shaft length having a configuration matching that of the linking passages and having flow-control elements constituted by ring seals and related passages at appropriate positions along the length of said operative portion of the shaft. For instance, in the preferred embodiment, each plug member has an operative portion carrying four sealing rings, e.g. O-rings, at intervals along its length so as to define three annuli disposed between pairs of sealing rings. The arrangement is such, in relation to the planes of the axes of the primary and secondary sets of passages in the matrix block to the major faces of the latter, that with such a plug member inserted into a linking passage, the central annulus of the plug member will be aligned with the relevant passage of one (e.g. the secondary) set of passages whereas one of the two outer annuli of the plug member will be aligned with the associated one of the other (e.g. primary) set of passages.

Depending upon the seal-effectiveness of the respective sealing rings on such a plug member and/or upon the provision of flow paths bridging one or other of the inner sealing rings, such a plug member may control flow between the linked primary and secondary set passages in accordance with which of the two outer annuli of its operative portion is facing the relevant one of the two said linked passages.

Thus, for instance, the two outer sealing rings and one of the inner sealing rings may be so arranged as to effectively seal against fluid flow in either direction whereas the remaining sealing ring may be asymmetric —e.g. by being formed as a cup seal or by being seated in an appropriately relieved groove—to seal only against fluid flow in one direction whilst to permit flow in the opposite direction. With a plug member of this form, its insertion into a linking passage of the matrix block so that the outer annulus defined between sealing rings effective to seal against fluid flow in either direction is facing one of the said two joined passages, fluid flow between the joined passages in either direction will be prevented, whereas if the plug member is inserted into the same linking passage in the reverse sense so that the other outer annulus of its operative portion is brought into facing relationship with one of the said joined passages, fluid flow will be permitted between said joined passages in the sense permitted by the asymmetric inner sealing ring.

As noted, a plug member may be formed with a bypass bridging one of the two inner sealing rings. When such a plug member is inserted into a linking passage of the matrix block so that its outer annulus bounded by such a bridged sealing ring faces one of the passages joined by that linking passage, fluid flow will be permitted between the joined passages in accordance with the nature of the by-pass. For instance this may permit fluid flow in either direction or it may include a oneway valve, a flow restrictor or a combination of flow-controlling elements so as to achieve a desired control over the flow of fluid between the said joined passages in accordance with requirements.

One or more of the sealing rings on a plug member of the preferred form may be arranged to be ineffective or of reduced effectiveness under low pressure differential so as to provide for venting or limited back flow under circumstances requiring this. Alternatively the plug member may include a vent passage to provide for continuous downstream venting when this is required.

It will be understood that in use of an interconnecting unit in accordance with the invention, those linking passages that are not fitted with plug members providing for communication between the associated primary and secondary passages joined thereby will be fitted with plug members that isolate the associated primary and secondary passages; that is, all the linking passages in the matrix block will be fitted with plug members, some providing for communication between primary and secondary passages and others, usually, serving only to isolate primary and secondary passages both from each other and from the exterior of the matrix block.

DESCRIPTION OF PREFERRED EMBODIMENTS

Figure 1:
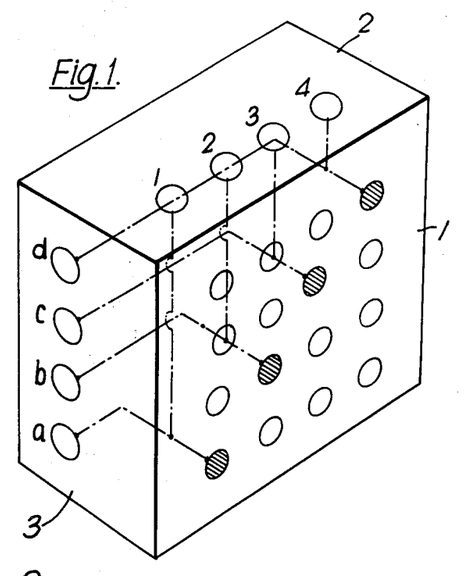
FIG. 1 is a schematic representation of a matrix block having four primary and four secondary passages.

FIG. 1 of the drawings illustrates schematically a parallelepipedon shape matrix block having a major (front) face 1, a top connecting edge face 2 and a lateral connecting edge face 3.

A set of four primary passages are shown schematically as extending from terminations (marked 1, 2, 3, 4) in the top connecting edge face 2, only the axes of these passages being shown in FIG. 1, these passages extending parallel with one another and at rightangles to the edge face 2 in a plane nearer to the front face 1 of the block than to its corresponding rear major face.

FIG. 1 also shows a set of secondary passages extending from terminations (marked a, b, c and d) in the lateral edge face 3, again only the axes of these passages being represented in FIG. 1 and being shown as being parallel with one another and at rightangles to the edge face 3. These passages lie in a plane approximately equidistant between the front face 1 and the corresponding rear major face of the block.

The terminations of the primary and secondary passages may be fitted with any suitable arrangements for making piping or other component connections thereto. Conveniently the terminations are fitted with appropriately shaped ribs for retentive engagement with a flexible pipe.

If desired each of the passages may extend wholly through the matrix block, with terminations in each of the relevant opposed faces of the block, to facilitate the making of connections to these passages, or the connecting of two or more matrix blocks in a parallel circuit system if required.

The matrix block is also penetrated by linking passages extending through the block from the front face 1 at rightangles thereto, there being sixteen such passages so arranged as individually to link each of the primary set passages with each of the secondary set passages.

For the purposes of illustration, four of the linking passages in the matrix block represented in FIG. 1 are shown with shaded terminations in the front face 1 of the block to identify the linking passages respectively linking primary passage 1 with secondary passage a;

primary passage 2 with secondary passage b; primary passage 3 with secondary passage c; and primary passage 4 with secondary passage d.

Figure 2:
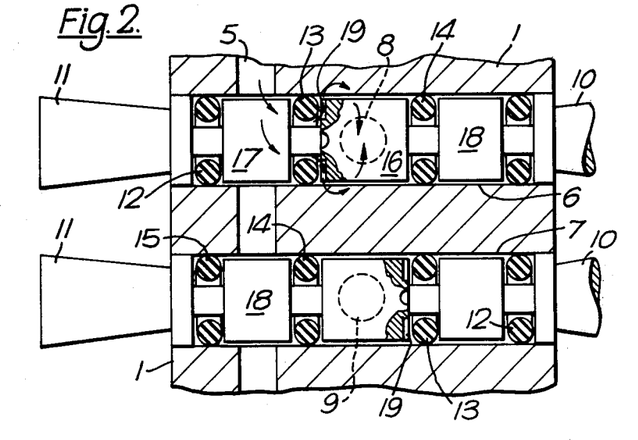
FIG. 2 is a sectional illustration of a part of the matrix block of FIG. 1, showing two of the linking passages thereof fitted with plug members of one preferred form.
Figure 3:
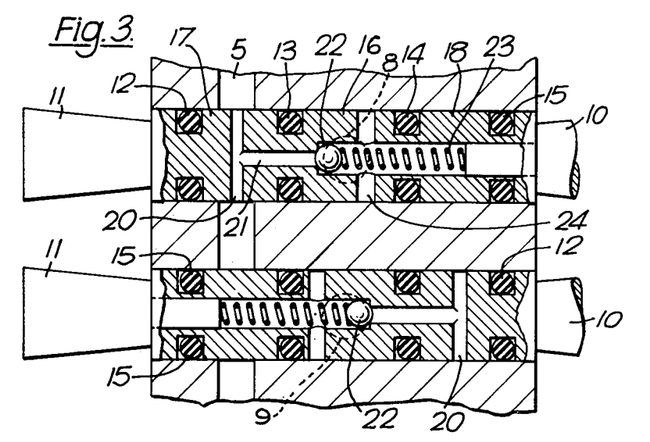
FIG. 3 is a view similar to FIG. 2 but illustrating plug members of another form.

The actual communication between the linked primary and secondary passages in the matrix block is controlled by plug members inserted into the linking passages and FIGS. 2 and 3 illustrate two forms of plug member that may be employed to accomplish such control of communication.

Thus FIG. 2 shows a portion of the matrix block in section on a plane containing the axis of a primary passage 5 and also the axes of the linking passages associated with that primary passage, two of these linking passages being shown at 6 and 7 respectively. As shown, the axes of the linking passages 6 and 7 intersect, respectively, the axes of secondary passages 8 and 9.

In FIG. 2, each of the linking passages 6, 7 is shown accommodating a plug member 10. The plug members 10 are identical and each comprises an operative portion in the form of a circular section shaft having a length equivalent to the length of the linking passage in which it is inserted, with reverse-tapered extensions 11 at each end to facilitate manipulation of the plug member and its insertion into and removal from a linking passage in the matrix block.

The operative portion of each plug member is formed with four circumferential grooves fitted with O-ring seals 12, 13, 14 and 15. The grooves and their seals thus divide the operative portion of the plug member into five annuli, three of which are disposed between pairs of seals.

The central annulus 16, between the seals 13 and 14, is so positioned that when the plug member is inserted into the linking passage of the matrix block this annulus is positioned in front of the secondary passage associated with that linking passage, whereas one or other of the annuli 17, 18 is positioned in front of the related primary passage. In the case of the uppermost of the two plug members shown in FIG. 2, it is the annulus 17 that is positioned in front of the primary passage 5 whereas in the case of the lower plug member it is the annulus 18 that is so positioned in front of the primary passage 5, for the reason that the two plug members are shown with opposite orientations within the respective linking passages 6 and 7.

The O-ring seals 12, 14 and 15 are disposed in plain-walled grooves in the operative parts of the plug member and so function in the usual way to restrict fluid flow past the seal in either direction under a pressure differential thereacross. Thus in the case of the lower plug member shown in FIG. 2 with its annulus 18 facing the primary passage 5, the seals 14 and 15 are effective to isolate the passage 5 from parts of the linking passage 7 outboard of those seals: consequently, if fluid pressure exists in the passage 5 there can be no flow past the seals 14 and 15 to, respectively, the secondary passage 9 or the external atmosphere at the front major face 1 of the matrix block.

The O-ring seal 13, however, is disposed in a groove that in the case illustrated has a wall bounding the annulus 16 formed with radial recesses 19 that prevent the O-ring from sealing the groove space from the periphery of the annulus 16 under the influence of a pressure differential across the seal 13 with the higher pressure on the outboard side of the seal. Thus in the case of the plug member fitted as shown in the linking passage 6 in FIG. 2, fluid may flow from the primary passage 5 to the secondary passage 8 past the seal 13, as indicated by the arrows. However, reverse flow along this pathway under an opposite pressure differential is precluded because the plain face of the groove bounding the annulus 17 provides for normal sealing of the O-ring 13 to prevent such flow.

From the foregoing it will be understood that with the plug member inserted into a linking passage in the orientation shown for the plug member in the passage 7, the seal 14 is effective to isolate the passage 5 from the passage 9 in respect of flow in either direction, whereas with the plug member orientated as shown in the passage 6, the seal 13 disposed in the path between the passages 5 and 8 permits flow between these passages in one direction but not in the other.

The annuli 16, 17 and 18 are of suitably smaller diameter than the bore of the linking passages, such as passages 6 and 7, in the matrix block and thereby permit the relevant flow to occur as indicated by the arrows in FIG. 2.

The form of plug member illustrated in FIG. 2 and described above is simple to construct as by a simple machining operation or by casting or moulding techniques and may be constructed from any suitable material, including plastics and like materials. However, because flow control is achieved by control of the sealing properties of the O-ring 13 in its groove and there are constraints upon clearances and flow path cross sections past the O-ring 13, the arrangement may not in some circumstances provide for as free fluid flow between the passages 5 and 8 as may be desired.

Accordingly the construction illustrated in FIG. 3 may be preferred in certain circumstances.

FIG. 3 is a view similar to FIG. 2 in that it shows a portion of the matrix block with a pair of plug members inserted into adjacent linking passages therein. As the arrangement illustrated differs from that of FIG. 2 only in regard to details of the plug members, items equivalent to those already described in relation to FIG. 2 have been given the same reference numerals as in FIG. 2 and will not be further described except so far as is necessary to indicate the differences in the construction of the plug members.

Thus the plug members illustrated in FIG. 3 each have an operative portion of cylindrical form and of a length equivalent to the length of the linking passages in which the plug member is to be inserted, this operative portion being divided into annuli 16, 17, 18 by O-ring seals 12, 13, 14 and 15 fitted in grooves on the operative portion of the plug member. However in this case, all the O-rings 12, 13, 14, 15 are accommodated in plain-walled grooves so as to be effective to seal against fluid flow in either direction under a pressure differential.

The annulus 17 is formed with one or more diametral passages 20 to provide both for free flow across the plug members between parts of a primary passage on either side of a linking passage having the plug member inserted therein in the manner shown in the upper part of FIG. 3, and also to provide a controlled by-pass of the seal 13. Thus the passage(s) 20 communicate with an axial passage 21 terminating in a valve seat engaged by a ball 22 urged against its seat by a spring 23. The annulus 16 is formed with at least one transverse passage 24, that, when the plug member is inserted in the manner indicated in the upper part of FIG. 3, faces the associated secondary passage in the matrix block. Accordingly, with the plug member inserted in this orientation, flow may occur via the passages 20 and 21 to unseat the ball valve 22 and flow via the passage 24 to the related secondary passage.

When a plug member of the form shown in FIG. 3 is inserted into the matrix block in the orientation illustrated for the lowermost of the two plug members shown in that Figure, the O-rings 14 and 15 act to seal the related primary passage both from the external atmosphere at front face 1 of the matrix block and from the region of the related secondary passage in the matrix block. Thus in this orientation the plug member prevents flow of fluid in either direction between the primary and secondary passages 5 and 9, illustrated in FIG. 3.

It will of course be understood that the one-way valve constituted by the ball 22 and its seat may be reversed in relation to the passages 20 and 24 so as to permit flow from the latter to the former instead of the converse as in the illustrated arrangement.

Instead of a ball valve, another form of flow control element might be incorporated in the flow path between the passages 20 and 24; for instance a flow-controlling throttle might be incorporated in this flow path.

Figure 4:
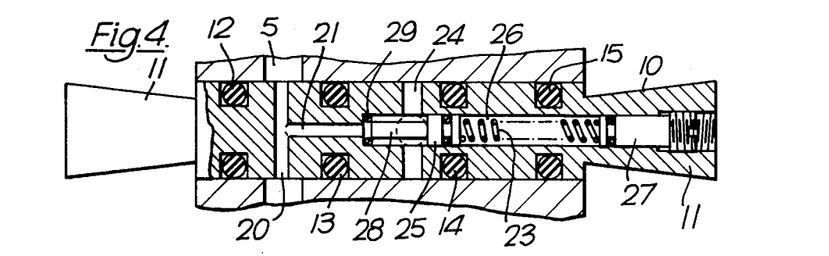
FIG. 4 is a view corresponding with the upper part lof FIG. 3 but showing a plug member responsive to the pressure differential applied thereto to control fluid flow therethrough.

FIG. 4 illustrates a special-purpose plug member that is adapted, when inserted in a linking passage of a matrix block, to permit fluid to flow between the linked primary and secondary passages only in response to the application of a preselected pressure differential to the flow-controlling elements of the plug member.

The plug member shown in FIG. 4 is similar in construction to that illustrated in FIG. 3 and corresponding parts are identified by the same references and will not be further described except so far as may be necessary to explain the function of the plug member.

Thus the plug member 10 of FIG. 4 has passages 20, 21, 24 providing for flow between the related linked primary and secondary passages in the matrix block when inserted into a linking passage of the latter so that the passage 20 in the plug member aligns with the primary passage, e.g. the passage 5 shown in FIG. 4. However, instead of a ball valve, the plug member of FIG. 4 has a reactive one-way valve element constituted by a piston 25 reciprocable in a passage 26 housing the spring 23 that in this case reacts against an adjustment screw 27 fitted in one of the extensions 11 of the plug member so as to permit adjustment of the thrust of the spring 23 upon the piston 25. The piston 25 has an extension 28 that is of smaller diameter than the passage 26 and terminates in a valve face that engages a valve seat, conveniently a sealing ring 29, at the junction between the passages 21 and 26.

It can be seen from FIG. 4 that the piston 25 is so positioned in the passage 26 that its front (lefthand) annular area surrounding the extension 28 is exposed to the pressure that exists in the passage 24. In the closed condition illustrated, the front face of the extension 28 is exposed to the pressure that exists in the passage 21. As a result of this arrangement, for any given standing fluid pressure in the passage 24 (i.e. in the related secondary passage of the matrix block) less than that capable of shifting the piston 25 against the thrust of spring 23, the piston will respond to the fluid pressure in the passage 21 to open communication between the passages 21 and 24 when an appropriate pressure is applied to the passage 21: that is to say, when a preselected pressure differential has been applied between the passages 21 and 24.

However, when the piston responds to such fluid pressure in the passage 21 and the valve first opens, the pressure in the passage 24 rises to that in the passage 21 so that the higher pressure in the passage 21 is applied both to the end of the extension 28 and to the annular area of the piston 25, to drive the piston further to the right as seen in FIG. 4 and fully open the flowpath between passages 21 and 24.

Moreover, the piston 25 will thereafter be held in the flowpath-open condition until the pressure in passages 21 and 24 has fallen to a suitably low value, less than that required in passage 21 initially to open the flowpath.

Thus, for a given standing fluid pressure at the secondary passage with which passage 24 communicates, the plug member of FIG. 4 will open communication between that secondary passage and the related primary passage in response to a given pressure in the said primary passage, opening fully with a snap-action, and will maintain such communication until such time as the pressure in passage 21 has fallen to a lower value when the plug member will close and effectively seal the secondary passage from the primary passage until such time as the pressure in the latter has once again risen to the necessary value for opening of the flowpath through the plug member.

Figure 5:
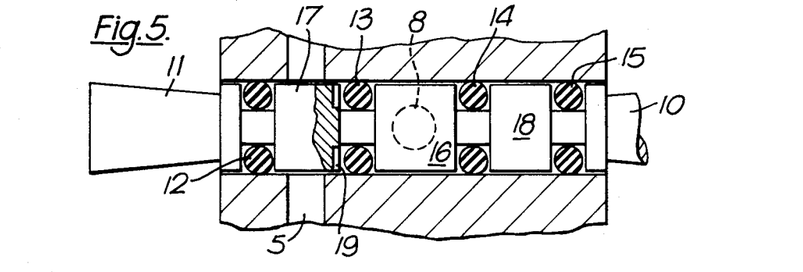
FIG. 5 is a view similar to FIG. 4 but showing another form of plug member, providing back flow facilities.

FIG. 5 illustrates yet another form of plug member the general construction of which is similar to that illustrated in FIG. 2. However, in the case of the plug member of FIG. 5, it is the groove wall bounding the annulus 17 that is provided with the radial recesses 19, rather than the groove wall bounding the annulus 16, so that when the plug member of FIG. 5 is inserted into a linking passage in the manner shown in that Figure, that is in a manner equivalent to the uppermost plug member shown in FIG. 2, it provides for fluid flow from the secondary passage 8 to the primary passage 5, under an appropriate pressure differential between these passages. Thus the plug member of FIG. 5 provides for backflow or flow in the reverse sense between the passages 5 and 8, in comparison with the plug member of FIG. 2.

It should be understood from the foregoing that by appropriately locating plug members of suitable forms in selected linking passages in the matrix block, desired connections and fluid flow paths can be set up between respective pairs of primary and secondary passages. Moreover the interconnections between the primary and secondary set passages may be readily altered simply by removing and reorientating the plug members in appropriate linking passages of the matrix block. In appropriate cases it may be necessary to substitute one type of plug member with another to achieve a required passage interconnection or fluid flow path.

To facilitate correct orientation of the plug members in the matrix block linking passages, the extensions 11 at opposite ends may have characteristic markings e.g. colouring, to differentiate one end from the other and different markings may be applied to the extensions 11 of different types of plug members so as to facilitate their recognition.

To ensure insertion of plug members to the correct depth in the linking passages the rear of the matrix block may be fitted with a cover or back plate, suitably spaced from the rear major face to be engaged by the rear end extension 11 of a plug member inserted to the correct depth in a linking passage.

A matrix block for an interconnecting unit in accordance with the invention may have more than two sets of passages adapted to be selectively linked by linking passages and plug members as described above. For instance, either of the primary and secondary sets of passages might be duplicated in another plane and so arranged that each linking passage intersects one passage out of each of the three sets of primary/secondary passages and is adapted to receiving appropriately constructed plug members to set up required interconnections between the respective passages of the three sets.

Figure 6:
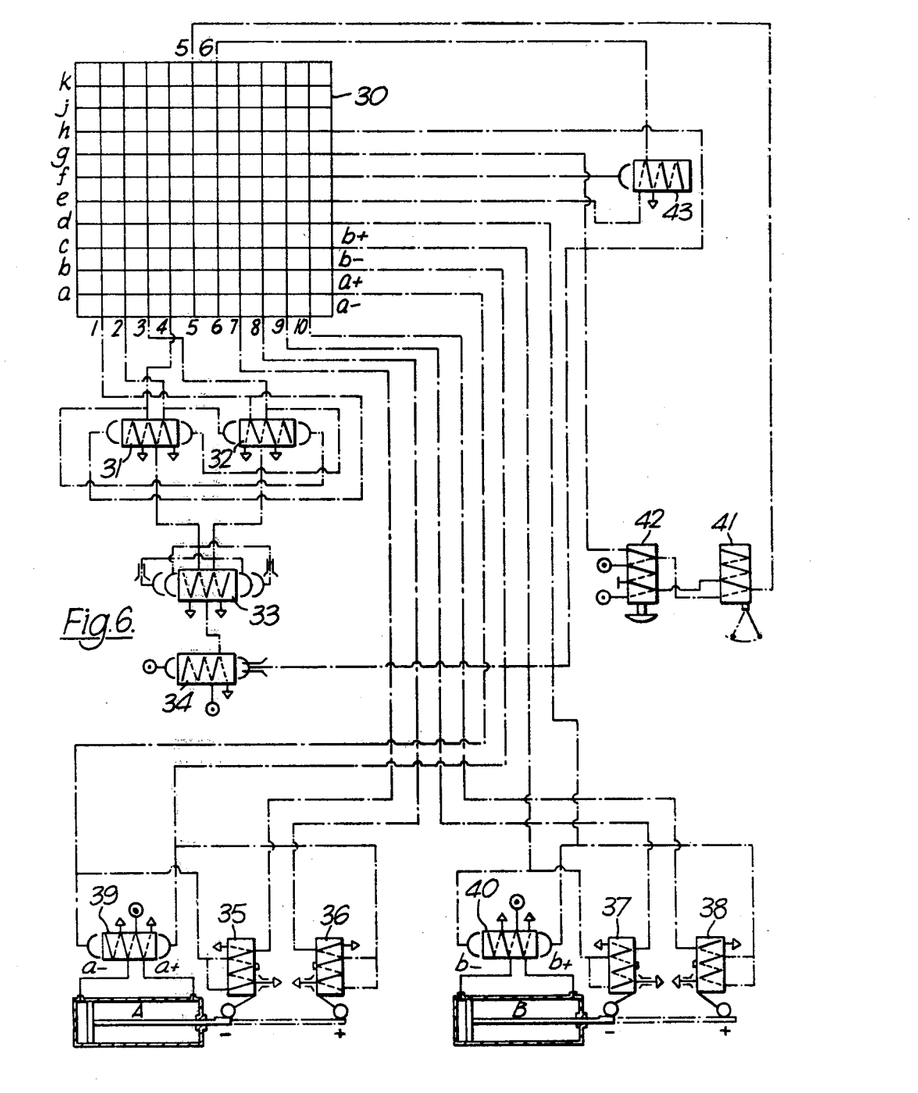
FIG. 6 is a schematic circuit diagram illustrating the use of an interconnecting unit in accordance with the invention in a pneumatic control system.

FIG. 6 illustrates schematically the application of an interconnecting unit in accordance with the invention for controlling the sequential operation of a pair of double-acting pneumatic cylinders, A and B respectively. The drawing illustrates an interconnecting unit with a matrix block 30 having ten primary and ten secondary passages, with one hundred linking passages.

In the circuit shown, the first four primary passages of the matrix block are supplied in turn by pressure from outputs from a four digit pneumatic counter that consists of a pair of multi-port double pilot operated relay valves 31, 32 supplied with air from a pneumatic binary element 33 that is in turn supplied by a feeder valve 34 shown for illustration purposes as a pneumatic timer, but which could for example, alternatively be a low pressure element such as a diaphragm-actuated valve such as is commonly used to provide the step-up element in a fluidic system. What is illustrated is a high pressure system, and the timer 34 is used to ensure that each cylinder movement is properly "home" before the counter steps to trigger the next movement.

An individual mechanically-actuated pilot valve detects the end of each stroke of each cylinder A, B, these pilot valves being marked 35, 36, 37 and 38 and having input connections that for a given pilot valve is common with the secondary passage output from the matrix 30 that supplies a signal to the related air pilot connection of a relay valve 39, 40 associated with the same cylinder. Thus, for instance, when an output from the matrix 30 signals the relay valve 39, the same signal is also applied to the pilot valve 35 or 36 that is arranged to detect the stroke end of the cylinder A to which the piston of the cylinder A moves as a result of the operation of the relay valve 39 by the said signal. Therefore, when the stroke of cylinder A is completed, the pilot valve 35 or 36 is operated and sends a signal back to another primary passage of matrix 30. This primary passage in the case of the pilot valve 35 is joined to a secondary passage, by an appropriate plug member in the linking passage at the notional intersection of the primary and secondary passages concerned, to provide an output to the counter feeder valve 34 so that this valve will be operated, cutting off the air supply to the binary element 33 and causing the initial pressure in the system to collapse, so taking pressure off the relay valve 39 and the counter feeder valve 34, whereupon the counter moves on to the next digit, and the next stage of the operating cycle is signalled.

The illustration shows valve means 41 for starting and stopping the cycle of operations, and also valve means 42 for causing operation for one cycle only. There is also shown an "AND" element 43 that provides for a pair of cylinder operations to take place in parallel while maintaining fully consequential interlocking.

To provide for resetting of a pilot valve 35-38 after its operation, the connection between the matrix block secondary passage and such a relay valve requires to be vented. This can be accomplished by the use of an appropriate plug member having an appropriate functional configuration to provide the necessary exhausting of the secondary passage. In the illustration of FIG. 6, however, an alternative venting arrangement is shown in which the pilot valves 35-38 are of the seven-port type and are connected in such a way as to leave a small air bleed open when the pilot valve is operated.

The binary element 33 is formed from a double duplex pilot-operated valve, two elements of which are supplied with pilot air through time-out timers. Thus, when an air pressure signal is applied to the inlet connection of the valve 33 by the valve 34, air passes through the open outlet port of the valve 33 to one of counter valves 31, 32 and also to one of the pilot connections at each end of the valve 33. The pilot operators of the valve 33 being fully balanced, no movement of the valve element takes place until the signal is removed from the valve, whereupon the pilot signal from one pilot connection exhausts immediately, but the other is held momentarily by the time-out timer, consequently unbalancing the valve element and causing it to reverse its position, so that the next input signal passes out through the other output port of the valve 33 and the same pattern of operation is repeated. The two alternate outputs of the valve 33 can, if desired, be applied to a pair of cross-setting cascade valves to give a division of the input signal by four in a repeating ring cycle; and further extensions of the principle can provide for higher numbers.

Figure 7:
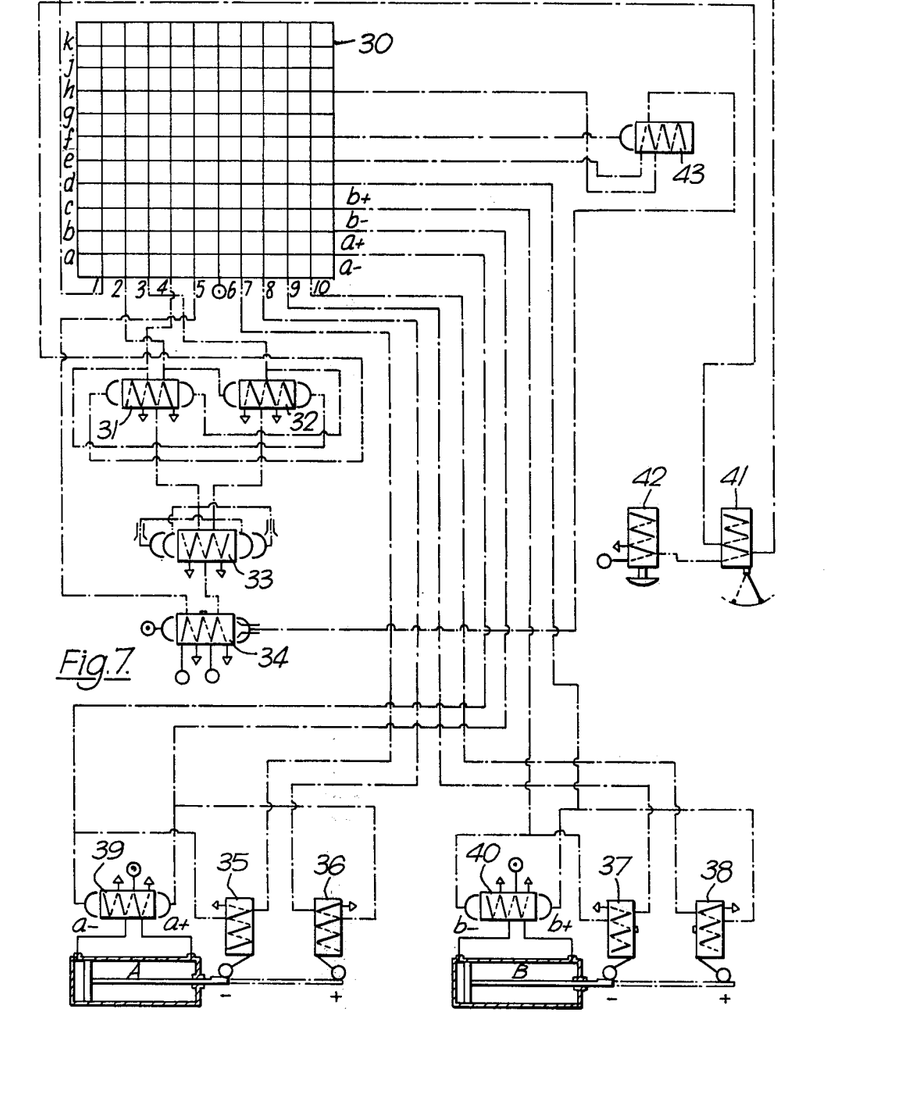
FIG. 7 illustrates a modification of the circuit arrangement of FIG. 6, utilizing an interconnecting unit with plug members of the form illustrated in FIG. 5.

FIG. 7 illustrates a modification of the arrangement of FIG. 6 to achieve the required venting of the pilot valves 35-38 without the requirement for these to be of the seven-port configuration, utilizing instead plug members of the form shown in FIG. 5.

In the circuit diagram of FIG. 7, components equivalent to those in the diagram of FIG. 6 have been given the same reference numerals as in the latter and will not be further described.

It will be seen that in FIG. 7, the feeder valve 34 controls the supply of air to the fifth primary passage of the matrix block 30, in addition to controlling the air supply to the binary element 33 as in FIG. 6. For convenience this extra function of the valve 34 has been illustrated as utilizing a separate air source and outlet port from those used for supplying the element 33 but it will be understood that the controlled supply to the element 33 could alternatively be branched to provide the correspondingly controlled supply to the (fifth) primary passage of the matrix block 30.

The secondary passages in the matrix block that are connected to the pilot valves 35-38 are joined to the fifth primary passage (having the intermittent air supply controlled by the valve 34) by means of plug members of the form shown in FIG. 5 inserted in the relevant linking passages in the manner represented by FIG. 5. As a result, when pressure is applied by the valve 34 to the fifth primary passage, the seals on the said plug members are operative to seal off the joined secondary passages so that the signal pressure concurrently applied to any one of the pilot valves 35-38 has no vent path. However, when the signal pressure and the pressure at the fifth primary passage are both released as a result of operation of the feeder valve 34, the seals on the said plug members allow venting back flow from the relevant pilot valve to the fifth primary passage and thence to the exhaust to which that passage is then connected by the valve 34.

There is also an air connection to the sixth primary passage of the matrix block 30.

The effect of this connection and the related circuitry shown in FIG. 7 is that it is possible to supply mains pressure air to, for example, the closed port of the AND element 43 by way of a secondary passage joined to the sixth primary passage by a suitable plug member, and thus employ this element 43 to provide a booster signal.

I claim:

1. For a fluid pressure-operated system, in interconnecting unit comprising
   (a) a matrix block having primary and secondary sets of non-intersecting passages disposed in superposed relationship with each passage of each set extending transversely across all the passages of the other set;
   (b) individual linking passages joining each passage of the primary set with every passage of the secondary set; and
   (c) flow-controlling plug members adapted to be fitted to said linking passages selectively to control fluid flow between primary and secondary passages joined by the linking passage fitted with such a plug member.

2. The interconnecting unit of claim 1, including plug members of different functional types respectively adapted, when inserted into one of said linking passages, to exercise different control functions in respect of fluid flow between the primary and secondary passages joined by said linking passage.

3. The interconnecting unit of claim 2, including a plug member adapted to prevent fluid flow, in at least one direction, between primary and secondary passages joined by a linking passage into which said plug member has been inserted.

4. The interconnecting unit of claim 2, including a plug member adapted to restrict fluid flow, in at least one direction, between primary and secondary passages joined by a linking passage into which said plug member has been inserted.

5. The interconnecting unit of claim 2, including a plug member having a flow path adapted to open to permit fluid flow in response to a preselected pressure differential existing between primary and secondary passages joined by a linking passage into which said plug member has been inserted.

6. The interconnecting unit of claim 1 in which each plug member incorporates a plurality of fluid flow-controlling elements for selective operational relationship with the joined passages of the primary and secondary sets by selective positioning of the plug member in a linking passage.

7. The interconnecting unit of claim 6, including plug members having both flow-blocking and one-way flow elements selectively positionable in operative relation to the joined passages of the primary and secondary sets by insertion in the relevant linking passage.

8. The interconnecting unit of claim 1 in which the matrix block is of generally rectangular parallelepipedon shape, the passages of the primary set are parallel with one another and with major faces of the block and extend from one edge face thereof, the passages of the secondary set are parallel with one another and with the major faces of the matrix block but extend from another edge face of the latter with their axis at rightangles to those of the primary set passages, two said sets of passages being at different depths measured from one major face of the block to the non-intersecting, the linking passages extending through the block from one major face to the other major face thereof, and each intersecting an individual pair of primary and secondary set passages.

9. The interconnecting unit of claim 8 in which the plug members each comprise a shaft having a length greater than the length of a linking passage and an operative portion having a configuration matching that of the linking passage, flow-control elements comprising ring seals and related passages being disposed in said operative portion of the shaft.

10. The interconnecting unit of claim 9 in which each plug member has an operative portion carrying four sealing rings at intervals along its length so as to define three annuli disposed between pairs of sealing rings.

11. The interconnecting unit of claim 10 in which said annuli are so positioned on the operative portion of the shaft that the central annulus will align with a passage of one said set and one of the outer annuli of the plug member will align with a passage of the other said set when the plug member has been inserted into a linking passage joining said passages of said one and said other sets.

12. The interconnecting unit of claim 10 or 11 in which the two outer sealing rings and one of the inner sealing rings are arranged to seal against flow in either direction whereas the remaining sealing ring is asymmetric to seal only against fluid flow in one direction whilst to permit flow in the opposite direction.

13. The interconnecting unit of claim 10 or 11 in which at least one of the sealing rings on a plug member is of reduced effectiveness under low pressure differential.

* * * * *